United States Patent [19]
Schwarz

[11] Patent Number: 4,506,310
[45] Date of Patent: Mar. 19, 1985

[54] PRECISION FUSING ARRANGEMENT

[75] Inventor: Alfred O. Schwarz, Parsippany, N.J.
[73] Assignee: AT&T Bell Laboratories, Murray Hill, N.J.

[21] Appl. No.: 590,964
[22] Filed: Mar. 19, 1984
[51] Int. Cl.[3] .................................... H02H 5/04
[52] U.S. Cl. .................................... 361/104; 337/166; 361/124
[58] Field of Search ............... 361/124, 119, 120, 104; 337/160, 166, 278

[56] References Cited

U.S. PATENT DOCUMENTS 3,810,062 5/1974 Kozacka ........................ 337/166 X
4,159,500 6/1979 Baumbach et al. ............ 361/124 X
4,333,121 6/1982 Schwarz ............................ 361/104

*Primary Examiner*—Reinhard J. Eisenzopf
*Attorney, Agent, or Firm*—John Francis Moran

[57] ABSTRACT

A fused station protector is disclosed wherein the fuse links have precisely controlled fusing characteristics. A shrink away foam element (28) encloses a portion of the fuse link (26) to provide a potential hot spot for slight current excesses. The remainder of the fuse link is in contact with arc quenching material (27) for extinguishing potential power arcs. Thus, the protector provides a precise fusing characteristic for slight current excesses and arc quenching capability for severe current excesses.

8 Claims, 4 Drawing Figures

PRECISION FUSING ARRANGEMENT

BACKGROUND OF THE INVENTION

This invention relates to the protection of electrical and electronic equipment and, more particularly, to a fusing arrangement for providing current overload protection.

Occasional faults in telephone lines outside of customer premises occur due to lightning phenomenon and accidental coupling of the electrical power distribution plant to the telephone loop plant. In order to safeguard customer telephone station sets, station protectors provide the interface between the outside loop plant and the equipment to be protected. Traditionally, station protectors employ carbon-block, air-gap, or gas-tube devices for over-voltage protection while protection from excessive currents is provided by fusing.

Generally, there are two diverse requirements which should be satisfied for overload current protection in any reliable protection device. First, the ability to reliably interrupt currents in excess of at least 350 amperes at 3,000 volts. Under this condition, the instantaneous vaporization of the fuse wire is likely to produce a potentially destructive power arc due to ionization. The solution to this problem has been to provide arc-extinguishing material surrounding the fuse wire for absorbing the energy from the melting fuse wire to prevent the formation of a power arc. This practice has proved to be successful.

The second requirement is the ability to provide predictable fusing for situations produced by slight over current conditions, which has been difficult due to a number of conditions or properties associated with the fuse wire. The demands on the second requirement have increased due to the introduction of semiconductor devices into telephone station apparatus which are less rugged than the traditional electromechanical components that are being replaced by the semiconductor components. For example, one of the conditions thought to exist on the fuse wire is an oxide buildup on its surface which produces an encapsulating effect for the molten material thereby raising the fusing threshold. Another disturbing effect is that the mounting orientation of the conventional protectors (vertical versus horizontal) affects the fusing characteristic. One approach to this problem has been to restrict the cross-section of the fuse wire with precision to provide a potential hot zone, but this has not resulted in reliable control of a precise fusing point. Furthermore, from a manufacturing standpoint a reliability problem is produced in producing the restricted cross-sectional zone of the fusing wire with the required precision.

SUMMARY OF THE INVENTION

The invention is directed to apparatus for providing electrical protection in circuits.

Broadly, the inventive concept takes the form of passing a fuse wire through an element of insulating foam to provide a localized hot spot with precise fusing characteristics.

In an illustrative application of the inventive concept the hot spots are placed on fusible links located within a protector block used as an interface in telecommunications systems between the loop plant and associated equipment.

DETAILED DESCRIPTION

Figure 1:
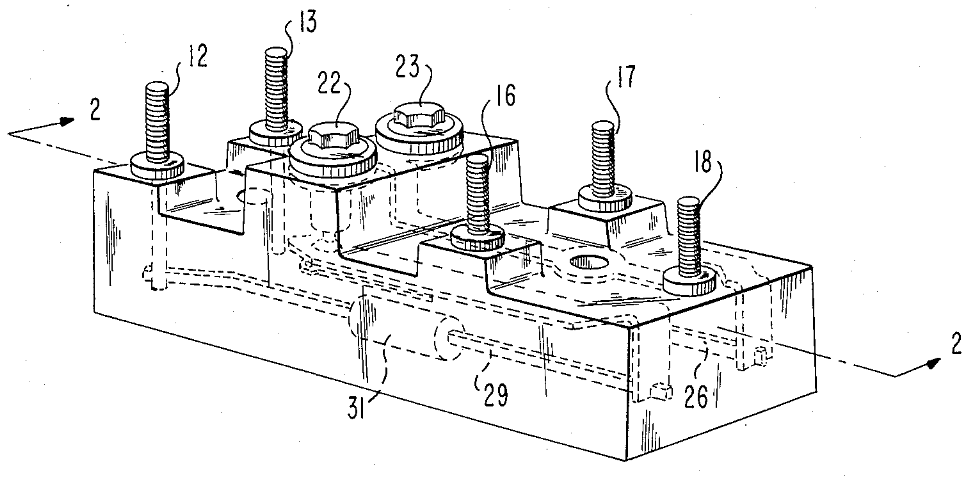
FIG. 1 is a perspective view of the protector block assembly.

FIG. 1 is a perspective view of the protector block assembly which provides a protective interface. Terminals 12 and 13 provide the termination for a 2-wire loop. Internally within the protector, terminals 12 and 13 are each connected individually by a suitable link (partially shown in phantom) respectively to terminals 16 and 17. In order to provide over voltage protection, terminals 16 and 17 are connected to ground terminal 18 internally through the protector by surge arresters, such as gas tube devices, each one secured under one of screw caps 22 and 23.

Figure 2:
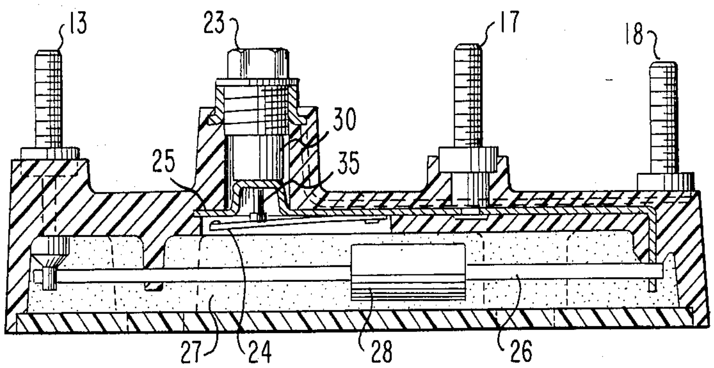
FIG. 2 is a cross-sectional view of the protector block of FIG. 1.

FIG. 2 is a cross-sectional view of FIG. 1 which depicts the mechanical and electrical connection between terminals 13 and 17 by fuse wire 26 surrounded by arc-extinguishing material 27. Fuse wire 26 is an appropriate lead alloy material having a rectangular cross-section. Material 27 is a suitable granular arc quench filler such as zinc borate, or appropriately sized quartz sand grains.

Of primary concern is that fuse wire 26 passes through a cylindrically shaped foam element 28 to provide a hot spot which localizes a melting zone of fuse wire 26. This hot spot is responsible for providing precision fusing characteristics. Foam element 28 provides a number of functions. Initially, foam element 28 provides an insulative barrier and an oxygen barrier to enlarge a hot spot wherein oxide formation on the surface of fuse wire 26 is discouraged. Furthermore, a suitable material for foam element 28 is ETHAFOAM SB manufactured by Dow Chemical which has a "memory" property and shrinks away from fuse wire 26 as it heats up to form an insulating cavity preventing contact with the surrounding arc quench filler 27.

Further observation of FIG. 2 discloses a feature concerning the presence of an arrester under screw cap 23. This involves contacts 24 and 25 which are normally open by the presence of arrester 30 (shown inside a metallic sleeve) under screw cap 23. Plunger 35 in response to the presence of arrester 30 pushes down to keep contacts 24 and 25 open. When arrester 30 is removed, contacts 24 and 25 close and ground out the conductor of the line (e.g., ring) associated with terminal 13. Removal of the arrester under screw cap 22 will also connect the conductor of the line (e.g., tip) associated with terminal 12 to ground. Accordingly, a malfunction is indicated to the central office via the line which may be traced to removal of the appropriate arrester or arresters as the case may be.

Figure 3:
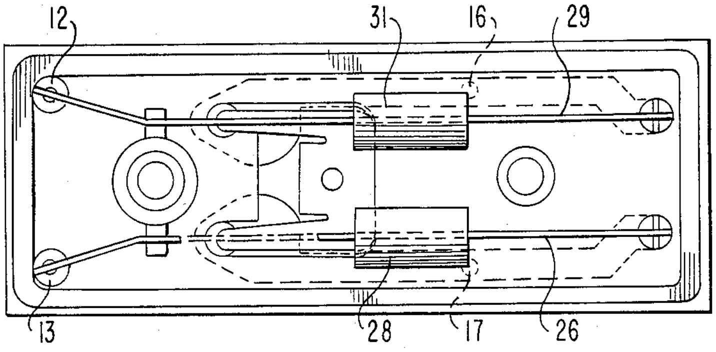
FIG. 3 is a rear view of the protector block.

FIG. 3 presents a bottom view of the protector assembly of FIG. 1 with the bottom panel removed along with the arc quench filler. In addition to fuse wire 26 between terminals 13 and 17, the protector includes fuse wire 29 which provides mechanical and electrical connection between terminals 12 and 16. Fuse wire 29 has its own foam element 31 to provide duplicative fusing properties between terminals 12 and 16.

Figure 4:
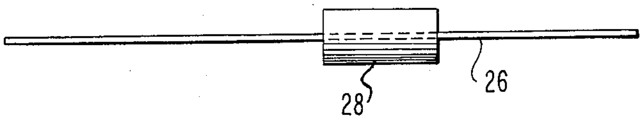
FIG. 4 shows the fuse wire passing through the foam element.

FIG. 4 is a top view of fuse wire 26 passing through cylindrical foam element 28. From the various drawing figures, it is apparent that fuse wire 26 has a rectangular cross section. In order to provide a reproducible fusing point the cross sectional area should be kept within a predetermined range.

While the invention has been shown and described with reference to particular embodiments therof, it is to be understood that numerous changes may be made in the form and details without departing from the spirit and scope of the invention. For example, the fusing wire may have a circular cross-section instead of a rectangular cross-section. Also the foam element may take on different shapes and still provide the hot spot feature. Furthermore, the fusible link may be used in other assemblies or sub-assemblies to provide fuse applications in any equipment desired. Finally it is not necessary that the fuse link be located in a cavity filled with arc extinguishing material.

What is claimed is:

1. A circuit protector comprising an insulative base having an elongated cavity, a line terminal held within the base and protruding into one end portion of the cavity, a station terminal held within the base and protruding into the other end portion of the cavity, a fuse link connected between the line and station terminals within the cavity, and a pellet of insulating foam enclosing a portion of the fuse link, the pellet of insulating foam being a material that shrinks away from the fuse link when the fuse link generates heat upon conducting a fault current for producing a cavity around the fuse link to provide a localized potential hot spot with precise fusing properties.

2. The circuit protector of claim 1 wherein said fuse link has a rectangular cross-sectional area.

3. The circuit protector of claim 1 further comprising a second line terminal and a second station terminal, the elongated cavity being of a size for the second terminals to protrude therein, and a second fuse link is connected between the second terminals, the second fuse link having another pellet of insulating foam of the same type of material as the first mentioned pellet enclosing a portion thereof to provide another localized potential hot spot having characteristics similar to the first mentioned hot spot.

4. The circuit protector of claim 3 further comprising arc-extinguishing material which fills the elongated cavity and surrounds the fuse links therein including the pellets of foam.

5. A circuit protector for telecommunication circuits generally of the type for providing over voltage protection by including voltage overload protector means including an arrester device for diverting a high voltage potential from the circuit being protected to ground, the circuit protector further including fusing means having a serial fusing link connected in the circuit and a foam pellet enclosing a predetermined portion of the fusing link to shield against surface oxidation, the foam material being of a type that shrinks away from the fuse link when hot to provide a potential hot spot in a cavity operable at a precise slight current overload point.

6. The circuit protector of claim 5 further comprising circuit contact means associated with the voltage overload protector means, the circuit contact means responsive only to the removal of the arrester device by shorting the circuit to ground to produce a fault indicative of the absence of over voltage protection.

7. A fusing device of the type including a serial fusing link responsive to a current overload condition by melting to produce an open circuit, the fusing device comprising means for precisely controlling the response of the fusing device to a current overload condition, said means including a foam element located on the serial fusing link for enclosing a predetermined portion of same, the foam element being an insulative material that shrinks away from the link for making a cavity producing an unsupported section of the serial fusing link to provide a potential hot spot responsive to a slight current overload condition to precisely define the fusing point of the device.

8. The fusing device of claim 7 wherein the insulative material is ETHAFOAM SB.

* * * * *